UNITED STATES PATENT OFFICE.

WILLIAM H. WILBER, OF BUFFALO, NEW YORK, ASSIGNOR OF ONE-HALF TO PHILIP P. SEEBER, OF SAME PLACE.

PAINT.

SPECIFICATION forming part of Letters Patent No. 311,401, dated January 27, 1885.

Application filed March 27, 1884. (No specimens.)

*To all whom it may concern:*

Be it known that I, WILLIAM H. WILBER, of Buffalo, in the county of Erie and State of New York, have invented new and useful Improvements in Priming-Paint, of which the following is a specification.

My invention relates to certain new and useful improvements in the production of a compound to be used as a priming or first coat of paint; and it has for its object to produce a paint-mixture which, when applied as a priming coat to wooden surfaces and brick or plastered walls, will fill up the cracks or smaller interstices and form a smooth surface, upon which the outer or top coat is applied.

In the production of a predetermined quantity of my improved compound I take fifty gallons of liquid asphaltum, and add thereto twenty gallons of rosin and ten gallons of linseed or cotton-seed oil. This mixture I heat to the boiling temperature by steam heat, to cause the ingredients to thoroughly commingle. I then add five gallons of turpentine or naphtha, and thoroughly mix the ingredients. I then add eight hundred pounds of white lead. The above quantities of the respective ingredients yield about eighty-five gallons of my improved compound. The quantities can of course be changed when a greater or less amount of the completed compound is desired. The mixture, when complete, is of a lead color, and can be changed to any desired shade by the use of a suitable pigment. From these ingredients a superior water-proof mixture is produced, which is especially suitable as a first coat or priming to wood, brick, and plaster, which dries quickly at any temperature, and which forms a hard, smooth surface, upon which the top or outer coat of paint is applied, thereby producing a smooth finish, and which can be used as a waterproofing-paint.

I am aware that it has been proposed to combine asphaltum, rosin, and linseed-oil with other ingredients to produce a waterproofing coating for use upon the roofs of buildings and the bottoms of boats, and this I do not claim; but

What I claim as new, and desire to secure by Letters Patent, is—

A priming-paint compound composed of liquid asphaltum, rosin, linseed-oil, turpentine or naphtha, and white lead, in their relative proportions substantially as set forth.

Witness my hand this 25th day of March, 1884.

W. H. WILBER.

In presence of—
F. L. BROWNE,
CARL F. GEYER.